United States Patent [19]

Takase et al.

[11] 4,428,348

[45] Jan. 31, 1984

[54] DIGITAL CONTROL SYSTEM FOR AN INTERNAL COMBUSTION ENGINE

[75] Inventors: Sadao Takase; Akito Yamamoto; Katsunori Oshiage; Akio Hosaka, all of Yokosuka, Japan

[73] Assignee: Nissan Motor Company, Limited, Yokohama, Japan

[21] Appl. No.: 328,026

[22] Filed: Dec. 7, 1981

[30] Foreign Application Priority Data

Dec. 10, 1980 [JP]  Japan .................................. 55-173160

[51] Int. Cl.³ .............................................. F02B 1/06
[52] U.S. Cl. ................................ 123/480; 364/431.05
[58] Field of Search ............... 123/476, 480, 489, 486, 123/589, 478; 364/431.05, 442

[56] References Cited

U.S. PATENT DOCUMENTS

| | | | |
|---|---|---|---|
| 4,201,159 | 5/1980 | Kawai et al. | 123/480 |
| 4,290,107 | 9/1981 | Suda et al. | 123/480 |
| 4,309,759 | 1/1982 | Tokuda et al. | 123/480 |
| 4,348,728 | 9/1982 | Sagisaka et al. | 123/480 |
| 4,373,187 | 2/1983 | Ishii et al. | 123/480 |

*Primary Examiner*—Raymond A. Nelli
*Attorney, Agent, or Firm*—Schwartz, Jeffery, Schwaab, Mack, Blumenthal & Koch

[57] ABSTRACT

A digital control system for an internal combustion engine uses a two stage register. The register is used to store digital data representative of sensed engine operating conditions and to feed such data to a programmable digital computer for processing. Processing time is improved by reading only one register containing the most significant data bits of the stored data for engine parameters having a relatively narrow dynamic range and reading both registers, containing all data bits of the stored data for engine parameters having a relatively large dynamic range.

15 Claims, 4 Drawing Figures

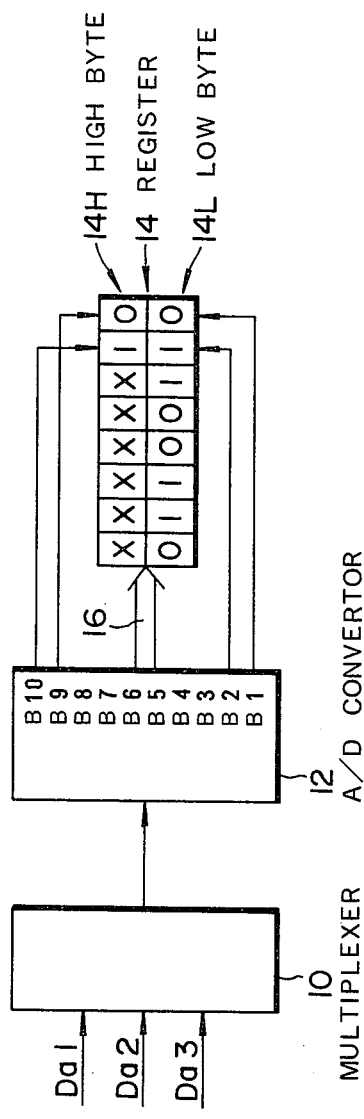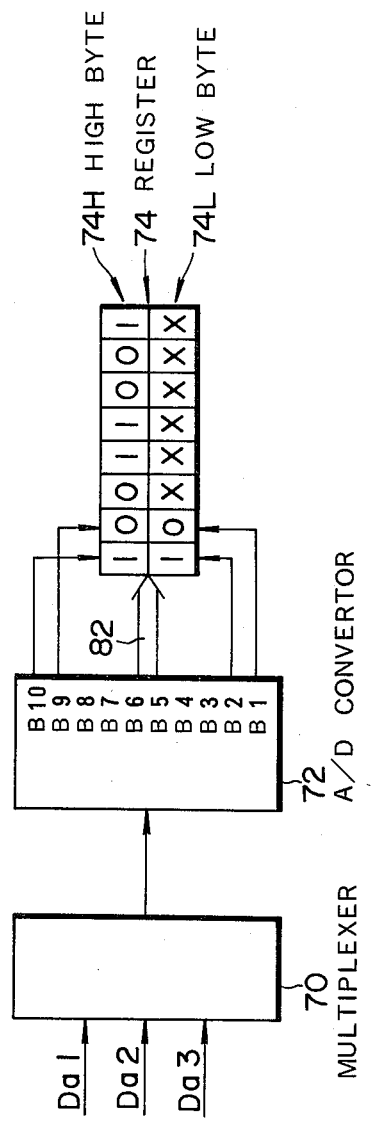

DIGITAL CONTROL SYSTEM FOR AN INTERNAL COMBUSTION ENGINE

BACKGROUND OF THE INVENTION

1. Field of the Invention

This invention relates to a digital control system for an internal combustion engine, and more particularly to an improvement in the method and apparatus of storing and processing digital output data from an analogue to digital convertor for optimal use by a processor of the control system.

2. Description of the Prior Art

It is known to utilize a digital control system for an internal combustion engine. The digital control system generally employs sensors which provide analogue output signals indicative of engine operating conditions such as air flow rate, engine coolant temperature, power source voltage, and others. In such a control system, an analogue to digital convertor (A/D convertor) transforms the analogue signals indicative of engine operating conditions into the corresponding digial signals, and a microprocessor receives the digital signals to determine the amount of fuel to be injected into the engine and the ignition timing to control the engine in response to the engine operating conditions.

The desired degree of accuracy in the transforming process of the A/D convertor depends on the kind of analogue input data. The data indicative of the air flow rate, for example, having a relatively great dynamic range needs an accuracy higher than that of the data having a relatively small dynamic range, such as data indicative of engine coolant temperature or the power source voltage. However all such data are commonly transformed into a fixed-bit, e.g., 10-bit, digital signals for simplifying the making of the system and especially the A/D convertor. These 10-bit signals are stored in a two-stage register each stage having one byte. Such a conventional system has a characteristic that data must be read out from both the register stages, necessitating two reading operations even when low accuracy is all that is required e.g. 8-bits, as will be described hereinafter. Such operation makes the calculation process complicated and the operation time undesirably long.

SUMMARY OF THE INVENTION

It is an object of the present invention to provide a digital control system for an internal combustion engine powering a vehicle or other device, wherein multi-level accuracy may be provided for input data to the conrtrol system.

Another object of the present invention is to provide a method and apparatus for use in a device, such as a vehicle engine, which has a programmable digital computer control system for controlling the device in response to sensed input signals which are indicative of device operating parameters. The method and apparatus permits optimal use of the digital computer in receiving and processing digital input signals which are fed to the digital computer from analogue sensors via an A/D convertor and a two-stage storage register. Either one or both stages of the two-stage storage register may selectively be used as required by the degree of accuracy and dynamic range of the sensed input parameter and the requirements of the subsequent calculation or processing by the digital computer.

According to the present invention, a digital control system for an internal combustion engine, includes first and second sensors for detecting first and second engine operating conditions as first and second analogue signals respectively. The first analogue signal has a dynamic range less than that of the second. A multiplexer is connected to the first and second sensors for selecting either first or second analogue signals. An analogue to digital convertor is connected to the multiplexer for transforming the selected analogue signal into a corresponding digital signal with a first number of bits. A first register is connected to the analogue to digital convertor for storing a second preset number of sequentially ordered bits of the digital signal starting with the most significant bit. The second preset number is less than the first preset number. A second register is connected to the analogue to digital convertor for storing the remaining bits of the digital signal. A control unit is connected to the multiplexer for controlling the selection of the first and second analogue signals. The control unit is also connected to the first and second registers for reading out only the second preset number of bits of the digital signal stored in the first register when the control unit controls the multiplexer to select the second analogue signal and reading out all the bits of the digital signal stored in the first and second registers when the control unit controls the multiplexer to select the first analogue signal. The control unit controls the engine in response to the first and second engine operating conditions.

The above and other objects, features and advantages of the present invention will be apparent from the following description of a preferred embodiment thereof, taken in conjunction with the drawings.

BRIEF DESCRIPTION OF THE DRAWINGS

FIG. 1 is a schematic diagram of circuit contained within a digital control system for an internal combustion engine of the prior art;

FIG. 3 is a schematic diagram of circuit including a multiplexer, an A/D convertor, and a register of FIG. 2.

DESCRIPTION OF THE PREFERRED EMBODIMENT

The pertinent portion of the aforementioned conventional control system for an internal combustion engine is illustrated in FIG. 1, wherein a multiplexer 10 selects and feeds one of the three kinds of analogue input data $Da_1$, $Da_2$, and $Da_3$ indicative of engine operating conditions to an analogue to digital convertor (A/D converter) 12, which transforms the selected data into the corresponding parallel 10-bit digital form. The A/D convertor 12 is connected to a register 14 for feeding the digital data to the register 14. The register 14 includes high and low byte storage locations 14H and 14L to store the 10-bit digital data. In FIG. 1, the output connections of the A/D convertor 12 to the register 14 are explicitly shown for output bits B1, B2 and B9, B10. For simplicity of illustration, the remaining connections are only generally indicated by a line 16 indicative of the remaining lines associated with the remaining bit positions B3-B8.

In operation of the circuit of FIG. 1, the convertor 12 feeds the digital output data in the form of "1001100110", for example, to the register 14. The eight least significant bits of the data, "01100110", are stored in the low byte storage location 14L in the order from the least to the most significant bits (from right to left in FIG. 1). The two most significant bits, "10", are stored in the high byte storage location 14H in the order from the least to the most significant bit (right to left). It is a characteristic of such conventional systems that data must be read out from both the high and low byte storage locations 14H and 14L, necessitating two reading operations even when low accuracy is all that is required e.g. 8-bits. Such operations makes the calculation process complicated and the operation time undesirably long.

Figure 2:
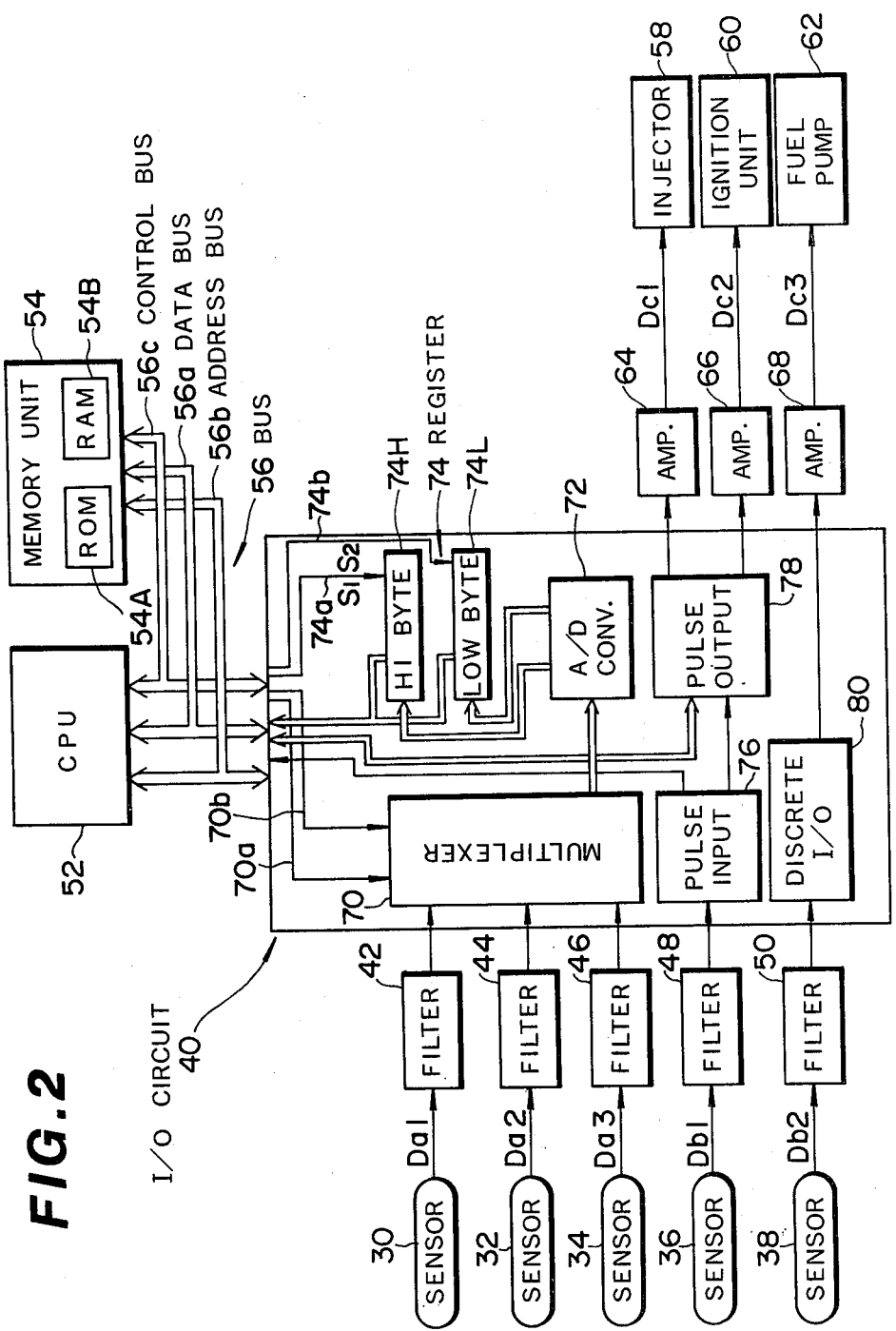
FIG. 2 is a schematic diagram of circuit constituting a digital control system for an internal combustion engine of the present invention.

Referring now to FIG. 2, there is shown a digital computer control system for an internal combustion engine according to an embodiment of the present invention, wherein sensors 30, 32, 34. 36, and 38 are provided for detecting engine operating conditions including the power source voltage. The sensor 30 is attached to an air intake duct and produces a voltage signal as an analogue input data $Da_1$ having a magnitude which depends on the flow rate of intake air. The sensor 32 is attached to an engine block and produces a voltage signal as an analogue input data $Da_2$ having a magnitude which depends on the temperature of engine coolant. The sensor 34 detects the voltage of the power source as an analogue input data $Da_3$. In this case, the sensor 34 merely consists of lines which are connected to the power source (not shown) to transmit the voltage thereof. The sensor 36 is associated with an engine crankshaft (not shown) and produces a pulse signal $Db_1$ upon rotation of the engine crankshaft at each preset rotational-angle thereof. The sensor 38 is associated with an engine throttle valve (not shown) and produces an on-off signal $Db_2$ which depends on whether or not the throttle valve is fully closed. The sensed analogue input data signals $Da_1$, $Da_2$, and $Da_3$ and signals $Db_1$ and $Db_2$ are fed to an input/output circuit (I/O circuit) 40 through filters 42, 44, 46, 48, and 50 respectively. These filters eliminate noise from the respective signals $Da_1$, $Da_2$, $Da_3$, $Db_1$, and $Db_2$.

The I/O circuit 40 is connected to a central processor unit (CPU) 52 and a memory unit 54 by means of a bus 56. The I/O circuit 40, the CPU 52, and the memory unit 54 constitute a microcomputer control unit for the engine. The I/O circuit 40 is also connected to an electrically-driven fuel injector 58, an engine ignition unit 60, and a fuel pump 62 through amplifiers 64, 66, and 68 respectively. The CPU 52 and the memory unit 54 are interconnected by the bus 56. The bus 56 contains a data bus 56a, an address bus 56b, and a control bus 56c which perform delivery and receipt of data, address, and control information respectively among the I/O circuit 40, the CPU 52, and the memory unit 54. In accordance with a program stored in the memory unit 54, the CPU 52 and the memory unit 54 determine the desired amount of fuel injected into the engine and the desired ignition timing by calculation or table look up using the sensed signals $Da_1$, $Da_2$, $Da_3$, and $Db_1$ fed through the I/O circuit 40. The I/O circuit 40 produces control signals $Dc_1$ and $Dc_2$ in response to the desired values of the amount of fuel injected and the ignition timing fed from the CPU 52 and the memory unit 54, and supplies the control signals $Dc_1$ and $Dc_2$ to the fuel injector 58 and the engine ignition unit 60 via the amplifiers 64 and 66 respectively in a conventional way. Thus, the digital computer unit controls the amount the fuel injected and the ignition timing in response to the engine operating conditions. In fact, the control signal $Dc_1$ takes the form of a pulse train which is synchronous with the engine crankshaft rotation, and the CPU 52 and the memory unit 54 determine the pulse width of the control signal $Dc_1$ which corresponds to a period during which the fuel injector 58 is open to inject fuel, and thus to control the amount of fuel injected. Since the fuel injector 58 has a response time for opening which depends on the power source voltage applied thereacross, the pulse width of the control signal $Dc_1$ is corrected by the CPU 52 and the memory unit 54 in response to the power source voltage. The pulse width of the control signal $Dc_1$ is also corrected by the CPU 52 and the memory unit 54 in response to the engine coolant temperature to obtain optimum engine operation under all temperature regions of engine coolant. Meanwhile, the control signal $Dc_2$ takes the form of a pulse train which determines the ignition timing and the dwell time of current conduction in the primary ignition coil (not shown) of the ignition unit 60. The CPU 52 and the memory unit 54 determine the pulse generating time of the control signal $Dc_2$ for the ignition timing control. Various algorithms may be utilized for determining such timing, and, for example, such timing may be determined in response to the engine speed (RPM) and the pulse width of the control signal $Dc_1$. The CPU 52 also determines the pulse width of the control signal $Dc_2$ for the dwell time control, for example, in response to the power source voltage for the purpose of correction.

The I/O circuit 40 includes a multiplexer 70, an analogue to digital convertor (A/D convertor) 72, a register 74, a pulse input circuit 76, a pulse output circuit 78, and a discrete input/output circuit 80. The multiplexer 70 is connected to the filters 42, 44, and 46 for receiving the analogue input data signals $Da_1$, $Da_2$, and $Da_3$ from the air flow sensor 30, the engine coolant temperature sensor 32, and the power source voltage sensor 34. The multiplexer 70 selects one of the analogue input data signals $Da_1$, $Da_2$, and $Da_3$ according to a command from the CPU 52. The command takes the form of control signals transmitted along the control bus 56c to the select terminals of multiplexer 70 via selection lines 70a and 70b. The A/D convertor 72 is connected to the multiplexer 70 for receiving the selected analogue input data signal from the multiplexer 70. The A/D converter 72 transforms the selected analogue signal into the corresponding digital data signals. The register 74 is connected to the A/D convertor 72 for receiving the digital output data signals from the A/D convertor 72. The register 74 stores the digital output data signals according to a command from the CPU 52. The command takes the form of control signals $S_1$ and $S_2$ transmitted along the control bus 56c to the strobe terminals of register 74 via strobe lines 74a and 74b respectively. The register 74 is connected to the data bus 56a for transmitting the stored data signal to the memory unit 54.

The pulse input circuit 76 is connected to the filter 48 for receiving the pulse signal $Db_1$ from the crank angle sensor 36. The pulse input circuit 76 consists of a pulse shaping circuit which transforms the pulse signal $Db_1$ into a corresponding rectangular pulse signal. The pulse input circuit 76 is connected to the data bus 56a for feeding the rectangular pulse signal to the CPU 52 and the memory unit 54 to determine engine rotational speed (RPM). The pulse output circuit 78 is connected to the bus 56 for producing and outputting the control signals $Dc_1$ and $Dc_2$ which are responsive to the desired values of the amount of fuel injected and the ignition timing respectively. The pulse output circuit 78 is also connected to the pulse input circuit 76 for receiving the crank angle pulse signal as a reference of ignition timing control. The discrete input/output circuit 80 is connected to the filter 50 for receiving the sensed signal $Db_2$ representative of the fully-closed position of throttle valve or the engine idling condition. The discrete input/output circuit 80 is connected to the fuel pump 62 via the amplifier 68 for feeding a control signal $Dc_3$ to the fuel pump 62. The discrete input/output circuit 80 controls the fuel pump 62 in response to the sensed signal $Db_2$ and, for example, reduces the rotational speed of fuel pump 62 to decrease a running noise of fuel pump 62 when the engine is under idling condition where the engine needs to be supplied with a relatively small amount of fuel injected.

As shown in FIG. 3, the A/D converter 72 has 10 output bits B1 to B10 and thus transforms the analogue signal selected by the multiplexer 70 into the corresponding parallel 10-bit digital data signals, for example "1001100110". The register 74 consists of high and low byte storage locations 74H and 74L of the parallel-in parallel-out type having the respective strobe terminals connected to the strobe lines 74a and 74b respectively (see FIG. 2). The output bits B10 to B3, the eight most significant output bits of A/D convertor 72 are connected to the high byte storage location 74H in the order from the most to least significant bits (from left to right in FIG. 3). The output bits B2 and B1, the two least significant output bits of A/D convertor 72 are connected to the low byte storage location 74L in the order from the most significant bit to least significant bit (left to right). In FIG. 3, the output connections of the A/D converter 72 are explicitly shown for the output bits B1, B2 and B9, B10. For simplicity of illustration, the remaining connections are only generally indicated by a line 82 indicative of the remaining lines associated with the remaining bit positions B3-B8. Thus, the eight most significant bits of the signal converted by the A/D convertor 72, for example "10011001", are stored in the high byte storage location 74H in the order from the most to least significant bit positions thereof, as shown in FIG. 3. The remaining two least significant bits of the converted signal, for example "10", are stored in the low byte storage location 74L.

Figure 4:
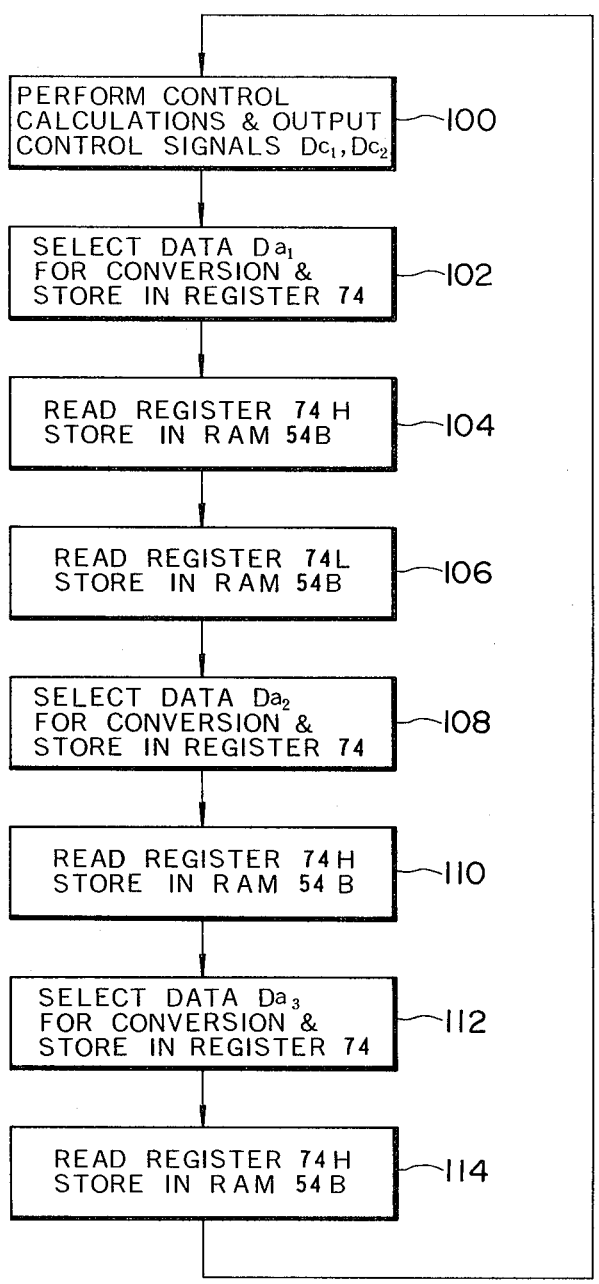
FIG. 4 is a flowchart of the program stored in the ROM of FIG. 2.

The memory unit 54 consists of a read only memory (ROM) 54A and a random access memory (RAM) 54B. The ROM 54A stores the program for controlling the I/O circuit 40, the CPU 52, and the memory unit 54 to determine the amount of fuel injected and the ignition timing. According to the program written in the ROM 54A, the I/O circuit 40, the CPU, and the memory unit 54 are controlled in a sequence as shown by the flowchart of FIG. 4. In a first block 100, the desired values of the amount of fuel injected, namely the pulse width of the control signal $Dc_1$, and the ignition timing are determined by use of the signals $Da_1$, $Da_2$, $Da_3$, and $Db_1$ indicative of the engine operating conditions. The control signals $Dc_1$ and $Dc_2$ are produced in response to the determined values of the pulse width and the ignition timing and outputted from the pulse output circuit 78 to the fuel injector 58 and the engine ignition unit 60 via the amplifiers 64, 66 respectively. In fact, the engine speed (RPM) is, firstly, determined by use of the signal $Db_1$ fed via the pulse input circuit 76 in a conventional way. Secondly, the pulse width of the control signal $Dc_1$ may be calculated, for example, by use of the following equation. $Pw = K_1 \cdot Q/N + K_2$, where Pw is pulse width; Q is flow rate of intake air; N is engine speed; $K_1$ is constant depending on engine coolant temperature for temperature correction; and $K_2$ is constant depending on power source voltage for voltage correction. Thirdly, the desired ignition timing is determined in response to the engine speed and the pulse width in a conventional way by looking up a table which holds a set of desired ignition timings as a function of engine speed and pulse width in the ROM 54A. Fourthly, the desired dwell time for ignition is determined in response to the power source voltage. Finally, the determined values of the pulse width, the ignition timing, and ignition dwell time are fed to the pulse output circuit 78 to produce the control signals $Dc_1$ and $Dc_2$. The specific algorithms utilized in the block 100 are not germane to the present invention. Many different algorithms may be employed such as shown in U.S. Pat. Nos. 4,199,812, 3,696,614.

In a second block 102, the control signal for selecting the analogue data signal $Da_1$ is transmitted to the select terminals of multiplexer 70 along the control bus 56c and the selection lines 70a and 70b. Then, the data signal $Da_1$ is selected among the analogue data signals $Da_1$, $Da_2$, and $Da_3$ by the multiplexer 70 and is fed to the A/D convertor 72 to be transformed into the corresponding 10-bit digital form. The digital data signals from the A/D converter 72 are stored in the register 74 (both high and low byte storage locations 74A and 74B respectively). In a third block 104, the control signal $S_1$ is transmitted along the control bus 56c and the strobe line 74a to the strobe terminal of the high byte storage location 74H of the register 74. In response to this control signal $S_1$, the eight most significant bits of the data corresponding to the analogue signal $Da_1$ are read out from the high byte storage location 74H and transmitted along the data bus 56a to the RAM 56B to be again stored. In a fourth block 106, the control signal $S_2$ is transmitted along the control bus 56c and the strobe line 74b to the strobe terminal of the low byte storage location 74L of the register 74. Then, the remaining two least significant bits of the data corresponding to the analogue signal $Da_1$ are read out and transmitted along the data bus 56a to the RAM 54B to be stored. Thus, the 10-bit digital data corresponding to the signal $Da_1$ are entirely read out and stored in the RAM 54B. In a fifth block 108, the control signal for selecting the analogue data signal $Da_2$ is transmitted to the select terminals of multiplexer 70 along the control bus 56c and the selection lines 70a and 70b. Then, the analogue data signal $Da_2$ is selected among the analogue data signals $Da_1$, $Da_2$, $Da_3$ and is fed to the A/D convertor 72 to be transformed into the corresponding 10-bit digital data signal. Again the digital data signals from the A/D convertor 72 are stored in the high and low byte storage locations 74H and 74L as shown in FIG. 3. In a sixth block 110, the control signal $S_1$ is transmitted along the control bus 56c and the strobe line 74a to the strobe terminal of high byte storage location 74H of register 74. Then, the eight most significant bits of the digital data corresponding to the analogue signal $Da_2$ are read out and transmitted to the RAM 54B to be again stored. The control signal $S_2$ for the low byte storage location 74L of register 74 is not generated in this block 110, and therefore the two least significant bits of the digital data are eliminated. In a seventh block 112, the control signal for selecting the analogue data signal $Da_3$ is transmitted along the control bus 56c and the section lines 70a and 70b to the select terminals of multiplexer 70. Then, the analogue data signal $Da_3$ is selected among the analogue data signals $Da_1$, $Da_2$, $Da_3$ and is fed to the A/D convertor 70 to be transformed into the corresponding 10-bit digital data signals. The digital data signals from the A/D convertor 72 are stored in the high and low byte storage locations 74H and 74L. In a eighth block 114, the control signal $S_1$ is transmitted along the control bus 56c and the strobe line 74a to the strobe terminal of high byte storage location 74H of register 74. Then, the eight most significant bits of the digital data corresponding the analogue signal $Da_3$ are read out and transmitted to the RAM 54B to be again stored. The control signal $S_2$ for the low byte storage location 74L of register 74 is not generated in this block 114, and therefore the two least significant bits of the digital data are eliminated. The processes in the blocks 100 to 114 are performed repeatedly in that order, so that the process in the block 100 is started after the process in the block 114 is finished. The digital data signals, corresponding to the analogue signals $Da_1$, $Da_2$, and $Da_3$, stored in the RAM 54B are again read out to determine the desired values of the pulse width of the control signal $Dc_1$ and the ignition timing in the block 100.

Since the analogue data signal $Da_1$ indicative of the air flow rate has a relatively large dynamic range, the signal $Da_1$ needs to be transformed into relatively high bit-number, for example 10, digital form and then processed with the same bit-number maintained to avoid impairment of accuracy. On the other hand, since the analogue data signals $Da_2$ and $Da_3$ indicative of the engine coolant temperature and the power source voltage respectively have respective relatively small dynamic ranges, it is sufficient for the signals $Da_2$ and $Da_3$ to be transformed into relatively low bit-number, for example 8, digital form and then processed with the same bit-number maintained to avoid impairment of accuracy. In fact, after transformation into the corresponding 10-bit digital forms, the digital data corresponding to the analogue signal $Da_1$ are processed with the bit-number, 10, maintained while the digital data corresponding to the analogue signals $Da_2$ and $Da_3$ are processed as 8 bit data after reduction from 10 to 8 in bit-number. Therefore, the accuracies of analogue signals $Da_1$, $Da_2$, and $Da_3$ are maintained at acceptable levels during process to determine the amount of fuel injected and the ignition timing. Meanwhile, the digital data corresponding to the analogue signals $Da_2$ or $Da_3$ are read out by only a one step operation in the blocks 110 or 114, so that the calculation process can be simple and the operation time can be short as compared to the prior art system of FIG. 1.

It should be understood that further modifications and variations may be made in the present invention without departing from the spirit and scope of the present invention as set forth in the appended claims. For example, the sensor 32 or 34 may be designed so as to detect another engine operating condition, such as temperature of engine intake air, temperature of engine exhaust, or air excessive percentage of intake air-fuel mixture, and the control system may be designed so as to control the engine in response to the foregoing detected and other engine operating condition.

What is claimed is:

1. A digital control system for an internal combustion engine, comprising:
    (a) a first sensor for detecting a first engine operating condition and generating a first analogue signal indicative thereof;
    (b) a second sensor for detecting a second engine operating condition and generating a second analogue signal indicative thereof, the second analogue signal having a dynamic range less than that of the first analogue signal;
    (c) a multiplexer connected to the first and second sensors for selecting either first or second analogue signals;
    (d) an analogue to digital convertor connected to the multiplexer for transforming the selected analogue signal into a corresponding digital signal with a first preset number of bits;
    (e) a first register connected to the analogue to digital convertor for storing a second present number of sequentially ordered bits of the digital signal starting with the most significant bit, the second preset number being less than the first preset number;
    (f) a second register connected to the analogue to digital convertor for storing the remaining bits of the digital signal; and
    (g) a control unit connected to the multiplexer for controlling the selection of the first and second analogue signals, the control unit being also connected to the first and second registers for reading out only the second preset number of bits of the digital signal stored in the first register when the control unit is effective to select the second analogue signal and reading out the first preset number of bits of the digital signal stored in the first and second registers when the control unit is effective to select the first analogue signal, the control unit operative in response to the digital signals corresponding to the first and second engine operating conditions for controlling said engine.

2. A digital control system as recited in claim 1, wherein the first sensor detects flow rate of engine intake air.

3. A digital control system as recited in claim 1 or 2, wherein the second sensor detects engine coolant temperature.

4. A digital control system as recited in claim 1 or 2, wherein the second sensor detects engine intake air temperature.

5. A digital control system as recited in claim 1 or 2, wherein the second sensor detects engine exhaust temperature.

6. A digital control system as recited in claim 1 or 2, wherein the second sensor detects air excessive percentage of intake air-fuel mixture.

7. A digital control system as recited in claim 1, wherein the first and second registers are composed of a main register which has high and low storage locations constituting the first and second registers respectively.

8. A digital control system as recited in claim 7, wherein each of high and low storage locations has one-byte and the analogue to digital convertor has 10 output bits so as to set the first preset number of bits of the digital signal to 10, the second preset number of bits of the digital signal stored in the high storage location being set to 8.

9. A digital control system as recited in claim 1, wherein said control unit comprises a programmable digital cumputer having a central processing unit and a memory storage unit.

10. A digital control system for an internal combustion engine, comprising:
(a) a first sensor for detecting flow rate of engine intake air and generating a first analogue signal indicative thereof;
(b) a second sensor for detecting power source voltage and generating a second analogue signal indicative thereof;
(c) a multiplexer connected to the first and second sensors for selecting either first or second analogue signals;
(d) an analogue to digital converter connected to the multiplexer for transforming the selected analogue signal into the corresponding digital signal with a first preset number of bits;
(e) a first register connected to the analogue to digital convertor for storing a second preset number of sequentially ordered bits of the digital signal starting with the most significant bit, the second preset number being less than the first preset number;
(f) a second register connected to the analogue to digital convertor for storing the remaining bits of the digital signal;
(g) an electrically-driven fuel injector for injecting fuel into the engine, the opening characteristic of the fuel injector depending on the voltage thereacross; and
(h) a control unit connected to the multiplexer for controlling the selection of the first and second analogue signals, the control unit being connected to the first and second registers for reading out only the second preset number of bits of the digital signal stored in the first register when the control unit is effective to select the second analogue signal, and reading out the first preset number of bits of the digital signal stored in the first and second registers when the control unit is effective to select the first analogue signal, the control unit being connected to the fuel injector for controlling the same in response to the digital signals corresponding to the flow rate of engine intake air and the power source voltage.

11. A digital control system as recited in claim 10, wherein the first and second registers are composed of a main register which has high and low storage locations constituting the first and second registers respectively.

12. A digital control system as recited in claim 11, wherein each of high and low storage locations has one-byte and the analogue to digital convertor has 10 output bits so as to set the first preset number of bits of the digital singal to 10, the second preset number of bits of the digital signal stored in the high storage location being set to 8.

13. A digital control system as recited in claim 10, wherein said control unit comprises a programmable digital computer having a central processing unit and a memory storage unit.

14. In a digital control system for an internal combustion engine, comprising a first sensor for detecting a first engine oprating condition and generating a first analogue signal indicative thereof, and a second sensor for detecting a second engine operating condition and generating a second analogue signal indicative thereof, the second analogue signal having a dynamic range less than that of the first analogue signal, the digital control system controlling the engine in response to the first and second engine operating conditions, a method of processing the first and second analogue signals including the steps of:
(a) selecting either one of first and second analogue signals;
(b) transforming the selected analogue signal into a corresponding digital signal having a first preset number of bits;
(c) storing a second number of sequentially ordered bits of the digital signal starting with the most significant bit into a first register;
(d) storing the remaining bits of the digital signal into a second register;
(e) reading out only the second preset number of bits of the digital signal stored in the first register when the second analogue signal is selected to be transformed and stored in the first and second registers;
(f) reading out all the bits of the digital signal stored in the first and second registers when the first analogue signal is selected to be transformed and stored in the first and second registers; and
(g) controlling the engine in response to the read out digital signals.

15. In a digital control system for an internal combustion engine, comprising a first sensor for detecting the flow rate of intake air and generating a first analogue signal indicative thereof, a second sensor for detecting a power source voltage and generating a second analogue signal indicative thereof, and an electrically-driven fuel injector for injecting fuel into the engine, the opening characteristic of the fuel injector depending on the power source voltage thereacross, the digital control system controlling the fuel injector in response to the first and second analogue signals to control the engine, a method of processing the first and second analogue signals including the steps of:
(a) selecting either one of first and second analogue signals;
(b) transforming the selected analogue signal into a corresponding digital signal having a first preset number of bits;
(c) storing a second number of sequentially ordered bits of the digital signal starting with the most significant bit into a first register;
(d) storing the remaining bits of the digital signal into a second register;
(e) reading out only the second preset number of bits of the digital signal stored in the first register when the second analogue signal is selected to be transformed and stored in the first and second registers;
(f) reading out all the bits of the digital signal stored in the first and second registers when the first analogue signal is selected to be transformed and stored in the first and second registers; and
(g) controlling the fuel injector in response to the read out digital signals to control the engine.

* * * * *